Dec. 18, 1923.

J. G. LEONARD

PACKING

Filed Feb. 14, 1923

1,478,040

Witness:

Inventor:
John G Leonard

Patented Dec. 18, 1923.

1,478,040

UNITED STATES PATENT OFFICE.

JOHN G. LEONARD, OF MAYWOOD, ILLINOIS.

PACKING.

Application filed February 14, 1923. Serial No. 619,800.

*To all whom it may concern:*

Be it known that I, JOHN G. LEONARD, a citizen of the United States, residing at Maywood, in the county of Cook and State of Illinois, have invented a certain new and useful Improvement in Packings, of which the following is a full, clear, concise, and exact description, reference being had to the accompanying drawings, forming a part of this specification.

My invention relates to packing and to packing materials.

One of the objects of the invention is to provide a simple, practical, uniform and inexpensive packing material.

Another object of the invention is to secure durability, flexibility, ready, quick and easy application.

Another object of the invention is to permit the advantageous use of graphite as a lubricant.

In the accompanying drawings Fig. 1 is a perspective view of a packing ring made of packing material embodying my present invention;

Figure 3:
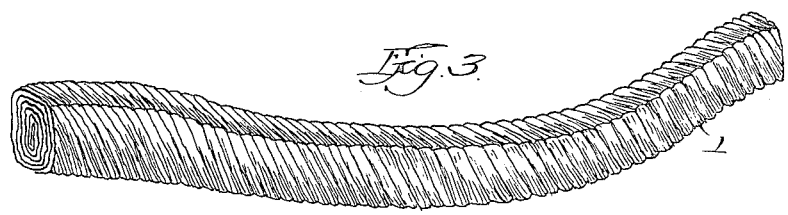
Fig. 3 is a perspective view of a strand of material from which the packing is made.

In carrying out the invention in the manner herein set forth, I provide a strand of material 1, which is flexible to permit it to be readily bent. The strand may be more or less rectangular in form, as shown in Fig. 3, although other shapes could be used. It is preferably composed of some sheet material, as for example, tin foil, and is made by twisting the sheet material into a strand of desired cross section, as shown in Fig. 3.

Figure 1:
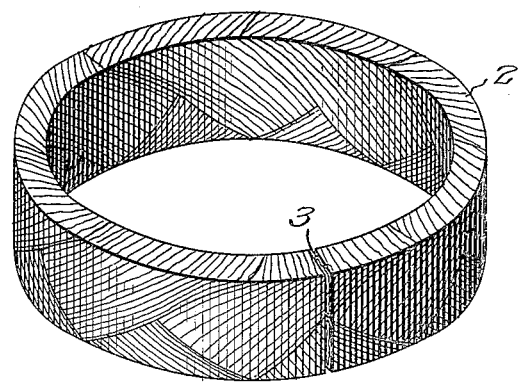
Figure 2:
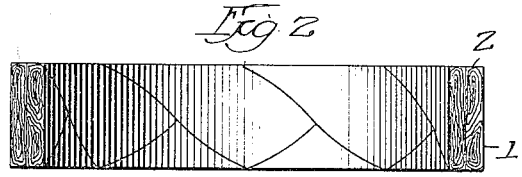
Fig. 2 is a perspective view of half of such a packing ring.

The packing is then made by taking a plurality of such strands 1, as for example two or three, and braiding or weaving them together to make packing material to be used as desired. Such material is shown formed into a packing ring 2, Figs. 1 and 2. When so braided the material may be made of more of less rectangular cross section, or otherwise as desired. The ring 2 is split at 3.

The packing material may, if desired, have a lubricant applied to it. For example, graphite may be readily applied, as in the process of forming the strand 1.

The packing thus formed will be very flexible, so that it may be bent or twisted as desired. It may be applied quickly and easily. It will also be inexpensive to make and thoroughly lubricated, because lubricant will be applied throughout its entire structure. Furthermore, water may be applied to the packing material without any trouble or disadvantage.

It will be understood that changes and modifications may be made without departing from the spirit of the invention.

What I claim is:

1. A packing composed of strands of flexible material woven together, each of said strands being composed of twisted flexible sheet material.

2. A packing composed of strands of flexible material woven together, each of said strands being composed of twisted tin foil.

3. A packing composed of a plurality of strands braided or woven together, each of said strands being composed of twisted and lubricated flexible sheet material.

4. A packing composed of a plurality of strands braided or woven together, each of said strands being composed of twisted and lubricated tin foil.

In witness whereof, I hereunto subscribe my name this 9th day of February, A. D., 1923.

JOHN G. LEONARD.